(12) United States Patent
Servaty et al.

(10) Patent No.: US 6,670,405 B1
(45) Date of Patent: Dec. 30, 2003

(54) METHOD FOR PRODUCING BLOCK-SHAPED POLYMETHACRYLIMIDE FOAMED MATERIALS

(75) Inventors: Sabine Servaty, Grosslittgen (DE); Werner Geyer, Muehltal (DE); Norbert Rau, Worms (DE); Manfred Krieg, Darmstadt (DE)

(73) Assignee: Roehm GmbH & CO KG, Darmstadt (DE)

( * ) Notice: Subject to any disclaimer, the term of this patent is extended or adjusted under 35 U.S.C. 154(b) by 0 days.

(21) Appl. No.: 09/958,929

(22) PCT Filed: Apr. 12, 2000

(86) PCT No.: PCT/EP00/03243

§ 371 (c)(1),
(2), (4) Date: Oct. 16, 2001

(87) PCT Pub. No.: WO00/63280

PCT Pub. Date: Oct. 26, 2000

(30) Foreign Application Priority Data

Apr. 21, 1999 (DE) .......................................... 199 17 987

(51) Int. Cl.[7] .................................................. C08J 9/36
(52) U.S. Cl. ........................... 521/53; 521/94; 521/117; 521/125; 521/128; 521/149; 521/183
(58) Field of Search ........................... 521/149, 94, 117, 521/125, 128, 183, 53

(56) References Cited

U.S. PATENT DOCUMENTS

| | | | |
|---|---|---|---|
| 4,576,971 A | * | 3/1986 | Baumgartner et al. |
| 5,698,605 A | * | 12/1997 | Krieg et al. |
| 5,928,459 A | * | 7/1999 | Geyer et al. |

FOREIGN PATENT DOCUMENTS

EP        874 019        10/1998

* cited by examiner

Primary Examiner—Morton Foelak
(74) Attorney, Agent, or Firm—Oblon, Spivak, McClelland, Maier & Neustadt, P.C.

(57) ABSTRACT

The invention relates to a method for producing block-shaped and plate-shaped polymethacrylimide foamed materials by copolymerizing methylacrylic acid and methylacryl nitrile, by subjecting the copolymerizate to a post-polymerization and cyclization in order to form polyimide, and by converting the same into a foamed material. The invention is characterized in that the copolymerization is carried out in the presence of a mixture containing at least three initiators with graduated half-life periods. The polymerization can be controlled especially well and yields polymerizate plates with thicknesses of up to 80 mm which can be easily foamed. The invention makes it possible to produce filling materials, especially plates and blocks containing electrically conductive particles.

14 Claims, 4 Drawing Sheets

METHOD FOR PRODUCING BLOCK-SHAPED POLYMETHACRYLIMIDE FOAMED MATERIALS

BACKGROUND OF THE INVENTION

1. Field of the Invention

The invention relates to a method for producing polymethacrylimide foamed materials as well as blocks, plates and the like of such polymethacrylimide foamed materials as well as the shaped articles obtained as intermediate products from the copolymer of methacrylic acid and methacrylonitrile.

2. Discussion of the Background

It is known how to produce polymethacrylimide foamed materials in the form of blocks. The first step is production of a preliminary product, which is already obtained in appropriate plate shape, from methacrylic acid and methacrylonitrile by copolymerization. The copolymer is then cyclized to the imide. An expanding agent present in the reaction mixture ensures appropriate foam formation when heated.

Heretofore, direct production of suitable polymer plates has been possible only up to a thickness of 30 mm. Since it is absolutely necessary to ensure a regular and reliable polymerization sequence, cooling and heating must be applied alternately during polymerization, especially because the polymerization can no longer be controlled and irregular structures are formed if heating is too intensive. These alternating cooling and heating phases are naturally cumbersome, and also entail high energy and water consumption.

In addition, polymer plates with thicknesses of only up to 30 mm suffer from numerous disadvantages. For example, if foamed blocks of relatively large thickness are needed, a plurality of foamed plates must be cemented together. Moreover, very large amounts of waste are produced from the edge regions during manufacture.

In German Patent No. 1817156 there is already described a method in which foamable plastics are produced in plate form by polymerizing mixtures of methacrylonitrile and methacrylic acid between two glass plates sealed with a flexible cord. An expanding agent such as formamide or monoalkylformamide is already added to the starting mixture. Radical sources are also added, in the form, for example, of a two-component mixture of tert-butyl perpivalate and benzoyl peroxide.

The polymerization takes place at temperatures of, for example, 40, 45 or 48° C., and it lasts about 15 to 40 hours. The product is then tempered at about 100° C. and subsequently heated to 170 to 300° C. Cyclization to imide and foam formation take place at the latter temperatures.

It is difficult to ensure regular polymerization, because the temperature can very easily exceed the specified temperature. Temperature fluctuations must therefore be controlled very accurately and compensated for by alternating cooling or heating phases.

Plates thicker than 30 mm cannot be produced by this method, since temperature elevations occur repeatedly and, because of the relatively poor thermal conductivity of the polymerization mixture, the heat generated cannot be dissipated rapidly enough. Uncontrollable and unmanageable temperature elevations naturally lead to further increase of radical formation, and so the reaction very easily runs out of control.

A method similar to that of German Patent No. 1817156 is described in European Patent 0356714 A1. As the radical source there is used, for example, azobisisobutyronitrile, and 0.1 to 10 wt % of electrically conductive particles is added to the mixture to be polymerized.

The aforesaid problems also occur in this method, and the polymer plates obtained according to Example 1 of this European Patent Application have a thickness of only 25 mm.

Although numerous methods for producing foamed plates of polymethacrylimides are already known, a need still exists for improved methods of producing same and also for improved polymethacrylimide plates.

In particular, therefore, a need exists for thick foamed blocks and especially for a method with which such blocks can be produced without having to cement a plurality of blocks together.

SUMMARY OF THE INVENTION

The object of the invention is therefore to provide such blocks, especially in plate form, as well as a method for producing the same, with which a uniform block with thicknesses up to 80 mm and more can be produced in one step, which permits a reliable and controlled polymerization process and which operates with reduced water and energy consumption and which yields blocks in which relatively little waste is produced during manufacture. Another object of the invention is to provide an appropriate method in which the tempering bath, especially the tempering water bath, can be operated largely with constant temperature.

This object is achieved by a method for producing block-shaped polymethacrylimide foamed materials by copolymerization of methacrylic acid and methacrylonitrile as well as further copolymerizable monomers if necessary in the presence of radical-forming initiators, postpolymerization and cyclization of the copolymer to polyimide and transformation to a foamed material, which is characterized in that the copolymerization is performed in the presence of a mixture comprising at least three initiators with graduated half lives.

The subject matter is therefore a method according to the teaching of claim 1. Further advantageous embodiments are described in claims 2 to 7, and correspondingly produced blocks are described in claims 8 to 9. Further subject matter of the invention is methods according to claim 10, polymer plates according to claim 11 and the use according to claim 12.

DETAILED DESCRIPTION OF THE INVENTION

Figure 1:
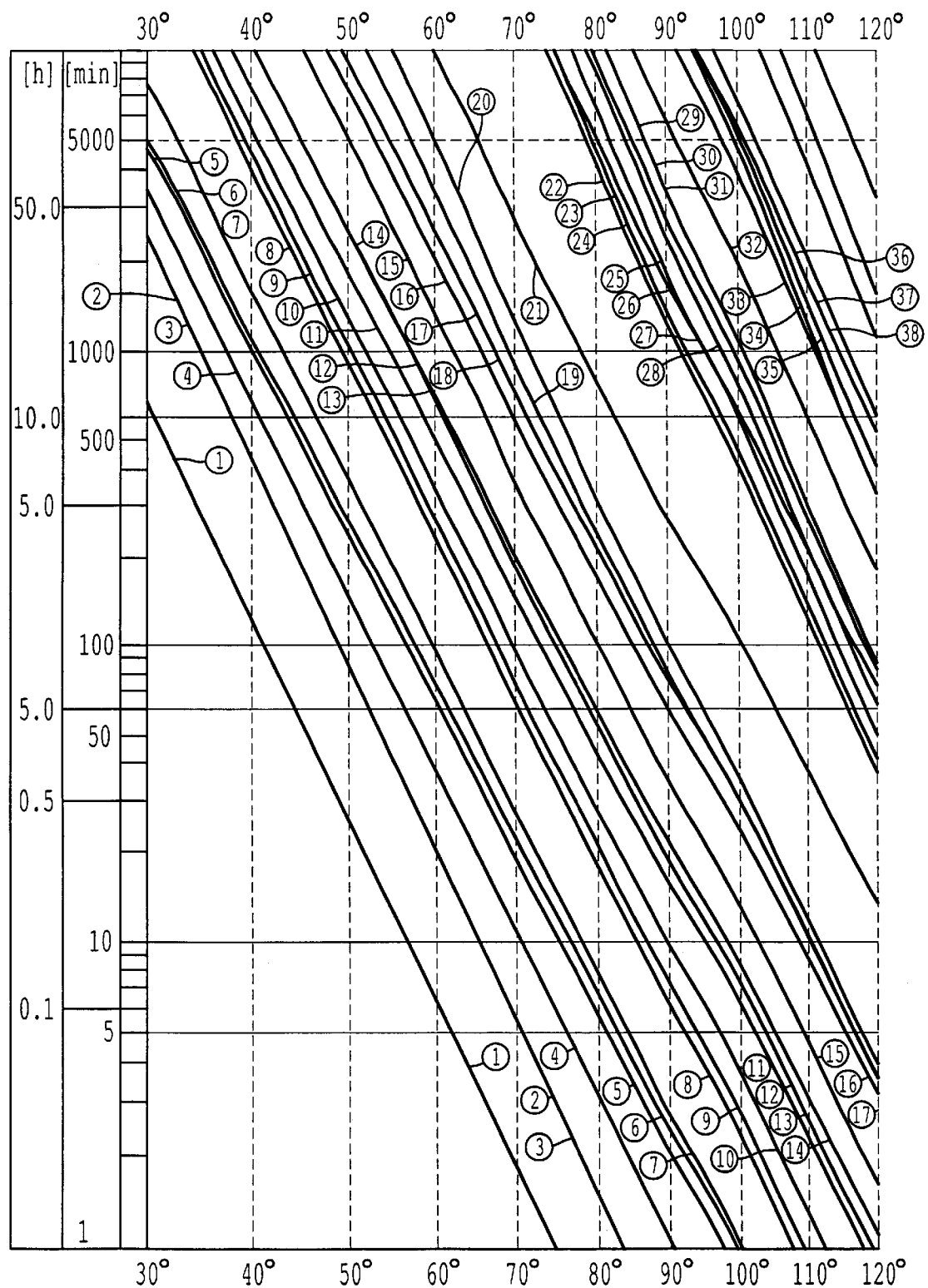
FIG. 1 shows the temperature dependence of the half-life of initiators listed in Table 2.

In connection with the invention, graduated half lives means that the at least three initiators each have different half lives at a given temperature or have the same half life, but in different temperature ranges. Preferably there are used initiators which each have a half life of one half hour in temperature ranges that are at least 10° C. apart.

In a particularly advantageous embodiment of the inventive method, there is used an initiator mixture which comprises agents that decompose at low temperature, medium temperature and high temperature and that have half lives of 1 hour in the ranges of 40 to 80, 80 to 110 and 110 to 200° C., preferably 110 to 150° C.

Preferably there are used initiator mixtures which comprise at least four initiators, each with a half life on the order of one hour in different temperature ranges.

The proportion of initiator mixture used can be varied within relatively broad limits; in this way the polymerization time can be controlled and also the polymerization temperature can be influenced by the proportion of initiators used. The quantities used in connection with the invention are expressed as weight parts of initiator per 100 weight parts of monomer. It is advantageous to use a total proportion of initiator mixture ranging from about 0.2 to 0.3 weight parts per 100 weight parts of monomer, preferably 0.21 to 0.24 weight parts.

The weight ratio of the individual initiators relative to each other in the initiator mixture can also be varied within relatively broad limits; preferably the weight ratio of the individual initiators relative to each other ranges from 1:1 to 1:10, preferably 1:1 to 1:4. Suitable proportions and mixing ratios can be determined by simple preliminary experiments.

Further subject matter of the invention are foamed blocks, especially foamed plates with a thickness of up to 80 mm, which are obtainable according to one of the foregoing methods.

In the first step of the production of block-shaped foamed materials, there are prepared monomer mixtures containing methacrylic acid and methacrylonitrile as main constituents, preferably in a mole ratio of between 2:3 and 3:2. In addition, further conomomers can be used, such as esters of acrylic or methacrylic acid, styrene, maleic acid or itaconic acid, etc., the anhydrides thereof, vinylpyrrolidone, etc. The proportion of such comonomers should be no more than 30 wt %, preferably no more than 10 wt % of the two main constituents. Small proportions of cross-linking monomers such as allyl acrylate can also be used. Preferably, however, the proportions should be at most 0.05 to 1 wt %. The polymerization mixture also contains at least three initiators, each of which has a half life on the order of one hour in different temperature ranges. It is advantageous to use appropriate initiators from at least four temperature ranges. Examples of suitable temperature ranges are 50 to 57° C. for the first range, 60 to 80° C. for the second range, 85 to 105° C. for the third range and 115 to 125° C. for the fourth range. As initiator in each of the individual temperature ranges, it is possible to use a single compound as initiator, but it is also possible to use two or more initiators with the appropriate half lives in the corresponding temperature ranges.

As suitable initiators for use according to the invention in a mixture comprising at least three initiators, there can be used standard initiators such as are used for radical generation in radical-initiated polymerization. These include compounds such as organic peroxides, such as dicumyl peroxide, peroxydicarbonates, such as diisopropyl peroxydicarbonate, peresters, such as tert-butylperoxy 2-ethylhexanoate and the like. Further compound types that can form radicals are also suitable in connection with the invention. They include in particular azo compounds such as azobis(isobutyronitrile) and azobis(2,4-dimethylvaleronitrile).

Initiator mixtures that are particularly suitable in connection with the invention are those whose components are selected from the following initiators: azobis (isobutyronitrile), t-butyl peroctoate, t-butyl perbenzoate, t-butyl perpivalate, azobis(2,4-dimethylvaleronitrile), t-butyl perneodecanoate, dibenzoyl peroxide, bis(4-t-butylcyclohexyl) peroxydicarbonate, cumylperoxy neodecanoate, 1,4-di(2-neodecanoylperoxyisopropyl) benzene and the like.

Figure 2:
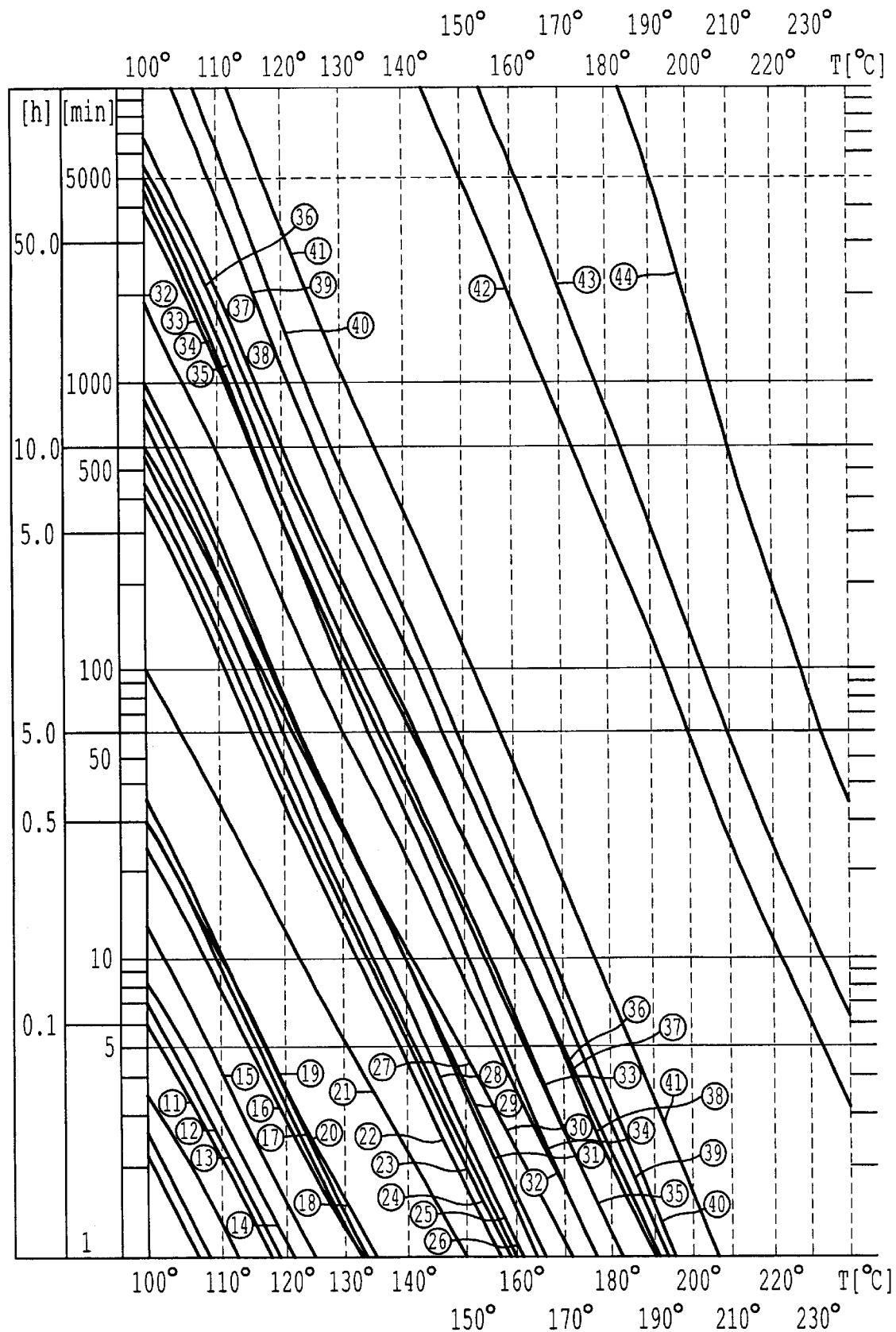
FIG. 2 shows the temperature dependence of the half-life of initiators listed in Table 2.

Table 1 lists suitable initiators, together with the temperatures for half lives of 10 hours, 1 hour and 1 minute, as well as the half lives in hours for a series of temperatures. Table 2 shows initiators who's dependence of half life on temperature is illustrated in FIGS. 1 and 2. It is a simple matter to compose initiator mixtures by means of the graphs of FIGS. 1 and 2.

Table 3 lists azo compounds which are suitable as initiators in connection with the invention.

Figure 3:
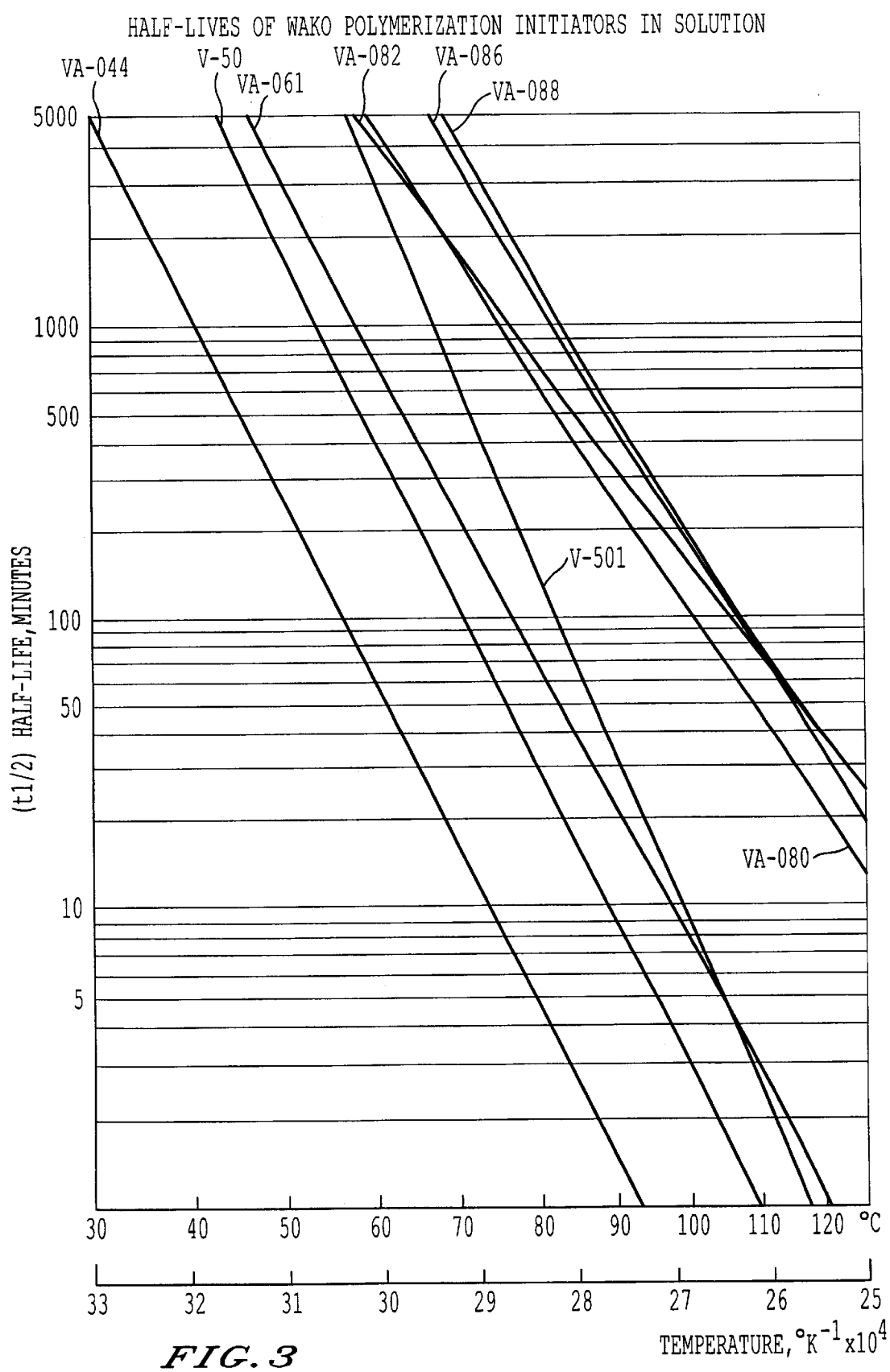
FIG. 3 shows the temperature dependence of half-lives of azo compounds listed in Table 3.
Figure 4:
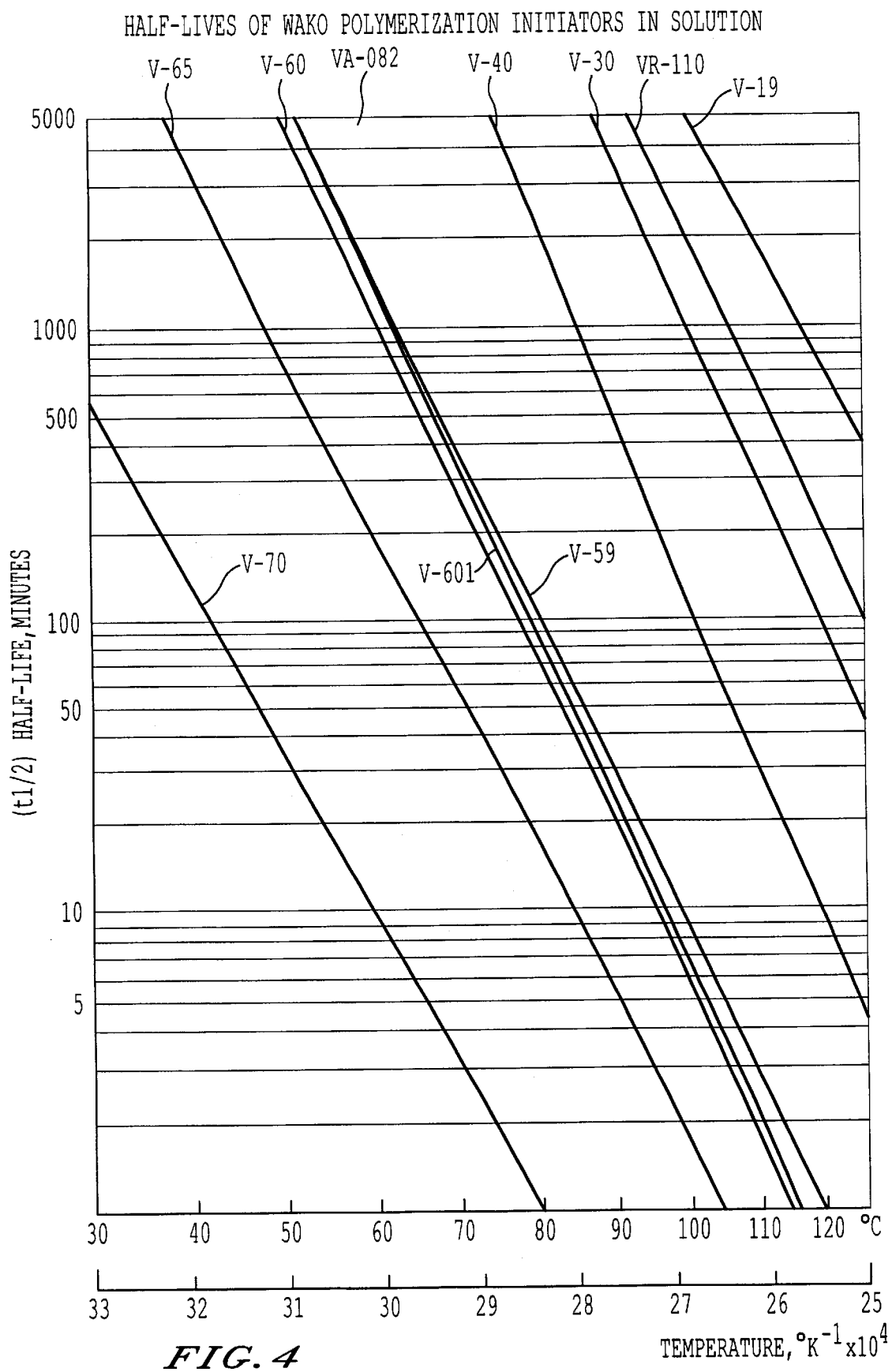
FIG. 4 shows the temperature dependence of half-lives of azo compounds listed in Table 3.

FIGS. 3 and 4 graphically illustrate half lives of several azo compounds listed in Table 3.

The half lives of the usable initiators generally already are given by the manufacturer. They can easily be determined analytically, for which purpose benzene has generally proved suitable as the solvent. The determination is generally performed with 0.1 molar solution.

The mixture for copolymerization also contains expanding agents, which either decompose or evaporate at temperatures of about 150 to 250° C., and in the process form a gas phase. Examples of nitrogen-containing compounds for use as expanding agents are urea, monomethylurea or N,N'-dimethylurea, formamide or monomethylformamide. Further nitrogen-free expanding agents are formic acid, water or monohydric aliphatic alcohols, especially those with three to eight carbon atoms. The expanding agents are generally used in proportions of 0.5 to 8 wt % relative to the monomers used.

Polymerization is expediently carried out in block form. During the production of blocks, for example in flat layers with thicknesses of up to 80 mm, the monomer mixture is disposed between two glass plates, which are sealed at their respective edges and form a kind of flat chamber. This flat chamber is surrounded by a water bath adjusted to the desired polymerization temperature.

The polymerization can be achieved largely or over broad ranges under isothermal conditions, or in other words at constant water-bath temperature. In many cases it is possible to keep the water-bath temperature constant from the beginning to the end of polymerization. If necessary, however, the water-bath temperature can also be kept constant for a long time at first and raised after a specified time, in order to perform part of the polymerization at a higher temperature.

The water-bath temperature can also be kept constant in this next polymerization phase, which is performed at a higher temperature.

The chosen water-bath temperature depends on the thickness of the polymerization chamber and on the formula used for polymerization. In this connection it is generally advantageous to shift the polymerization temperature and thus also the water-bath temperature to lower values with increasing density of the plate to be produced.

The appropriate temperature for the formula and thickness can be optimized in each case by simple preliminary experiments.

It is self-evident that the temperature must be adjusted to the chamber thickness and the formula such that the heat liberated during polymerization can be adequately dissipated without allowing undesired temperatures to develop in the polymerization mixture during polymerization. After completion of the polymerization process, which is controlled by the surrounding water bath, postpolymerization is performed in an oven. Postpolymerization is generally performed at temperatures of 38 to 140° C. In general, 10 to 1000 hours is sufficient for final polymerization in the tempering oven.

After completion of polymerization, the block is heated to a temperature of about 180 to 250° C., at which temperature cyclization to the imide structure and foam formation take place. Times of 3 to 5 hours are usually sufficient for this thermal posttreatment.

The blocks obtained in the process are characterized by a homogeneous regular structure.

Further subject matter of the invention is a method for producing polymer plates by copolymerization of methacrylic acid and methacrylonitrile as well as further copolymerizable monomers if necessary in the presence of radical-forming initiators and postpolymerization, characterized in that the copolymerization is performed in the presence of a mixture comprising at least three initiators with graduated half lives.

These polymer plates are formed as intermediate products during production of the block-shaped methacrylimide foamed materials according to the invention. Further subject matter of the invention is polymer plates obtainable by the method specified hereinabove.

It was particularly surprising that, with the inventive method, it is possible to perform the polymerization isothermally, or in other words at constant temperature, and thus obtain polymer blocks which have thicknesses of up to 80 mm and which exhibit a uniform properties profile through the entire thickness of the block, thus indicating regular homogeneous polymerization. The foamed blocks produced therefrom can be manufactured as such, so that only very little waste is produced at the edge regions. In this way it is possible to produce shaped articles of appropriate thickness using only a single block, whereas a plurality of blocks cemented together was formerly necessary for this purpose. The resulting blocks or plates, which are foamed in one piece, preferably have thicknesses of 80 to 300 mm.

The foamed plates or foamed blocks according to the invention are very valuable materials and can be used in particular as components in aircraft construction. The polymer blocks produced according to the invention are characterized by extremely regular structure, can be stored indefinitely and, if necessary, can be transformed to foamed plates from case to case by appropriate heating.

EXAMPLES

The invention will be explained in more detail by means of the following examples:

Example 1

A mixture of 61 parts of methacrylic acid, 39 parts of methacrylonitrile, 4.7 parts of formamide and 4.2 parts of 2-propanol and an initiator mixture of 0.3 parts of t-butyl perpivalate, 0.04 parts of t-butyl per-2-ethylhexanoate, 0.07 parts of t-butyl perbenzoate and 0.077 parts of cumyl perneodecanoate is polymerized for 66 hours at a water-bath temperature of 38° C. between two glass plates spaced 23 mm apart and sealed by a sealing cord, after which postpolymerization is performed for 24 hours in an oven at a temperature of 115° C. Regular plates are obtained. During the polymerization, which is controlled by the water bath, temperature fluctuations are practically zero or only slight, and do not necessitate readjustment of the water-bath temperature.

The obtained plates can be transformed without problems to foamed plates by heat treatment at a temperature of 170 to 200° C.

Example 2

A mixture identical to that of Example 1 is polymerized in a flat chamber whose glass plates are spaced 30 mm apart. In this case the water bath is kept at 33° C. for 92 hours, at 33 to 38° C. for 10 hours and at 38° C. for 14 hours. Tempering in the oven at temperatures of 115° C. is performed for 40 hours.

The plates have uniform structure and can be transformed without problems to foamed materials.

Example 3

A composition identical to that of Example 1 is polymerized in a flat chamber whose glass plates are spaced 50 mm apart. The water bath is kept at 28° C. for 198 hours, at 28 to 37° C. for 30 hours and at 37° C. for 24 hours. Postpolymerization at a temperature of 115° C. is performed for 50 hours.

Examples 4 to 6

In the following examples, a polymerization mixture with the following composition is polymerized: 56 parts of methacrylic acid, 44.0 parts of methacrylonitrile, 1.0 parts of formamide, 3.3 parts of 2-propanol, 0.31 parts of allyl methacrylate, 0.03 parts of t-butyl perpivalate, 0.03 parts of t-butyl per-2-ethylhexanoate, 0.1 parts of t-butyl perbenzoate and 0.077 parts of cumyl perneodecanoate. The polymerization is performed in flat chambers whose glass plates are spaced 23 mm, 30 mm and 50 mm apart respectively. For 23 mm the polymerization time is 80 hours at 37° C. and the postpolymerization time in the oven is 32 hours; for 30 mm spacing, 114 hours at 32° C., 10 hours at 32 to 38° C. and 24 hours at 38° C. as well as postpolymerization in the oven for 45 hours; for 50 mm spacing the polymerization time is 198 hours at 27° C., 24 hours at 27 to 37° C. and 24 hours at 37° C. Postpolymerization in the oven lasts for 57 hours. All plates exhibit regular structure and can be processed to foamed materials without difficulty.

Further examples are listed in tabular form in Table A.

TABLE A

| Initiators | Thickness (mm) | Polymerization temperature (° C.) | ΔT (° C.) |
|---|---|---|---|
| DIPND:V77:V69:V73 | | | |
| 0.083:0.03:0.04:0.07 | 23 | 38 | 2.0 |
| 0.078:0.03:0.04:0.07 | 23 | 38 | 1.4 |
| 0.09:0.03:0.04:0.07 | 23 | 38 | 2.3 |
| 0.09:0.03:0.04:0.07 | 30 | 35 | 3.4 |
| 0.09:0.03:0.04:0.07 | 50 | 29 | 2.3 |

ΔT denotes the maximum temperature difference between water bath and polymerization mixture during polymerization.

DIPND=1,4-di(2-neodecanoylperoxyisopropyl)benzene
TBPP=t-butyl perpivalate
TBPEH=t-butyl peroctoate
TBPB=t-butyl perbenzoate The polymer plates obtained in this way have a uniform regular structure. During polymerization, which is controlled by a constant water-bath temperature (polymerization temperature), the temperature in the polymerizing mass also remains practically constant. The differences inside the polymerizing mass are only a few degrees, at most 3.4° C. The temperature during polymerization is monitored by a thermocouple inserted into the polymerizing mass. The slight temperature fluctuations are negligible, and are far removed from the temperature excursions that occur when the operation is performed with only one or two initiators and it is tried to control the reaction with an isothermal water bath. Under those conditions temperature excursions of 13° C. and more occur, whereby the polymerization becomes uncontrollable, accelerated polymerization occurs and plates are obtained which either are of low quality or must be scrapped.

It was further surprising that the inventive process can also be applied to the production of polymer plates or to the corresponding plate-shaped or sheet-shaped foamed materials that contain fillers. For example, plates containing standard fillers can be obtained. In a preferred embodiment of the invention, it is also possible to produce foamed materials which contain electrically conductive particles, especially carbon particles such as conductive carbon black, an example being Ketjenblack 600EC, a commercial product manufactured by Akzo Nobel Chemie. Besides carbon black, it is also possible to use carbon fibers as fillers either alone or in addition to other fillers.

Example 7

Production of polymer plates filled with carbon black 1680.00 g of carbon black (Ketjenblack 600EC) is dispersed for 50 minutes in 41901.18 g of methacrylic acid, 32656.08 g of methacrylonitrile, 2982.29 g of 2-propanol, 149.11 g of MgO and 1.4911 g of allyl methacrylate. The dissolved initiators are then stirred in and the polymerization solution is evacuated for 30 minutes. The polymerization solution is also stabilized with 50 ppm of quinone.

A second chamber is filled in the same way, except that dispersion lasts for 45 minutes and evacuation for 40 minutes. A third chamber is filled with the same composition, but dispersion is performed under vacuum for 25 minutes, after which evacuation is continued for a further 20 minutes. The polymerization was carried out at 34° C. for 73.25 hours in all three cases. Thereafter tempering was performed for 13 hours at 34 to 60° C., 3 hours at 60° C., 10 hours at 60 to 100° C., 5 hours at 100 to 115° C. and 3 hours at 115° C. The obtained polymer plates have flawless quality. The temperature fluctuations during polymerization are negligible.

TABLE 1

Half lives of organic peroxides 0.1 molar in benzene (unless otherwise indicated)

| No. | INTEROX Code | Chemical name | Activation energy [kJ/mol] | Temperature [° C.] for a half life of 10 h | 1 h | 1 min[5] |
|---|---|---|---|---|---|---|
| 1 | ASCP | ACETYL CYCLOHEXANE SULFONYL PEROXIDE | 124 | 31 | 46 | 75 |
| 2 | DIPND | 1,4-DI(2-NEODECANOYLPEROXYISOPROPYL)BENZENE[1] | 114 | 37 | 54 | 85 |
| 3 | CUPND | CUMYLPEROXY NEODECANOATE | 115 | 38 | 55 | 90 |
| 4 | *) | PEROXYDICARBONATE | 124 | 41 | 57 | 90 |
| 5 | IPPC | DIISOPROPYLPEROXY DICARBONATE | 119 | 44 | 61 | 95 |
| 6 | TAPND | Tert-AMYLPEROXY NEODECANOATE | 113 | 44 | 62 | 100 |
| 7 | TBPND | Tert-BUTYLPEROXY NEODECANOATE | 121 | 47 | 64 | 100 |
| 8 | TAPPI | Tert-AMYLPEROXY PIVALATE | 121 | 53 | 71 | 110 |
| 9 | DCLBP | DI(2,4-DICHLOROBENZOYL) PEROXIDE | 121 | 54 | 72 | 110 |
| 10 | TBPPI | Tert-BUTYLPEROXY PIVALATE | 121 | 56 | 74 | 110 |
| 11 | INP | DI(3,5,5-TRIMETHYLHEXANOYL) PEROXIDE | 117 | 59 | 78 | 120 |
| 12 | DP | DIDECANOYL PEROXIDE | 126 | 62 | 80 | 120 |
| 13 | LP | DILAUROYL PEROXIDE | 126 | 62 | 80 | 120 |
| 14 |  | DI(2-METHYLBENZOYL) PEROXIDE | 119 | 62 | 81 | 120 |
| 15 | DHPEH | 2,5-DIMETHYL-2,5-DI(2-ETHYLHEXANOYLPEROXY)HEXANE | 137 | 67 | 84 | 125 |
| 16 | PMBP | DI(4-METHYLBENZOYL) PEROXIDE | 125 | 70 | 89 | 130 |
| 17 | BP | DIBENZOYL PEROXIDE | 126 | 72 | 91 | 130 |
| 18 | TAPEH | Tert-AMYLPEROXY 2-ETHYLHEXANOATE | 126 | 72 | 91 | 130 |
| 19 | TBPEH | Tert-BUTYLPEROXY 2-ETHYLHEXANOATE | 135 | 74 | 92 | 130 |
| 20 |  | Tert-BUTYLPEROXY ISOBUTYRATE | 130 | 77 | 96 | 135 |
| 21 | TBPM | Tert-BUTYLMONOPEROXY MALEATE | 116 | 82 | 104 | 150 |
| 22 | TMCH | 1,1-DI(tert-BUTYLPEROXY)-3,3,5-TRIMETHYLCYCLOHEXANE[2] | 143 | 95 | 114 | 155 |
| 23 | CH | 1,1-DI(tert-BUTYLPEROXY)CYCLOHEXANE[2] | 138 | 97 | 117 | 160 |
| 24 |  | Tert-BUTYLPEROXY ISOPROPYLCARBONATE | 138 | 97 | 117 | 160 |
| 25 | TBPIN | Tert-BUTYLPEROXY 3,5,5-TRIMETHYLHEXANOATE | 147 | 100 | 119 | 160 |
| 26 | DHPBZ | 2,5-DIMETHYL-2,5-DI(BENZOYLPEROXY)HEXANE | 147 | 100 | 119 | 160 |
| 27 | TBP-EHC | Tert-BUTYLPEROXY (2-ETHYLHEXYL)CARBONATE[2] | 128 | 100 | 122 | 175 |
| 28 |  | Tert-BUTYLPEROXY ACETATE | 149 | 102 | 121 | 160 |
| 29 | TABP | Tert-AMYLPEROXY BENZOATE[2] | 143 | 102 | 122 | 160 |
| 30 | TBPB | Tert-BUTYLPEROXY BENZOATE | 143 | 104 | 124 | 165 |
| 31 | BU | 2,2-DI(tert-BUTYLPEROXY)BUTANE[2] | 143 | 104 | 124 | 165 |
| 32 | NBV | n-BUTYL-4,4-DI(tert-BUTYLPEROXY) VALERATE | 141 | 110 | 131 | 175 |
| 33 | EBU | ETHYL-3,3-DI(tert-BUTYLPEROXY) BUTYRATE[3] | 144 | 114 | 135 | 180 |
| 34 | DCUP | DICUMYL PEROXIDE | 152 | 116 | 136 | 175 |
| 35 | BCUP | Tert-BUTYLCUMYL PEROXIDE | 154 | 118 | 138 | 180 |
| 36 | DTAP | DI(tert-AMYL) PEROXIDE[4] | 129 | 118 | 142 | 190 |

TABLE 1-continued

Half lives of organic peroxides

| | | | | | | | |
|---|---|---|---|---|---|---|---|
| 37 | DIPP | DI(tert-BUTYLPEROXYISOPROPYL)BENZENE | 142 | 120 | 142 | 190 |
| 38 | DHBP | 2,5-DIMETHYL-2,5-DI(tert-BUTYLPEROXY)HEXANE | 142 | 120 | 142 | 190 |
| 39 | DTBP | DI(tert-BUTYL) PEROXIDE | 152 | 125 | 146 | 190 |
| 40 | DYBP | 2,5-DIMETHYL-2,5-DI(tert-BUTYLPEROXY)HEX-3-YNE | 154 | 128 | 149 | 195 |
| 41 | HMCN | 3,3,6,6,9,9-HEXAMETHYL-1,2,4,5-TETRAOXACYCLONONANE[2] | 146 | 135 | 158 | 205 |
| 42 | TBHP | Tert-BUTYL HYDROPEROXIDE | 149 | 173 | 200 | 260 |
| 43 | CC DFH | 3,4-DIMETHYL-3,4-DIPHENYLHEXANE | 150 | 182 | 210 | 270 |
| 44 | CC DFB | 2,3-DIMETHYL-2,3-DIPHENYLBUTANE | 195 | 210 | 234 | 285 |

(Half lives in hours) No.

| Nr. | 20° | 30° | 40° | 50° | 60° | 70° | 80° | 90° | 100° | 110° | 120° | 130° | 140° | 150° | 160° | 170° | 180° | 190° |
|---|---|---|---|---|---|---|---|---|---|---|---|---|---|---|---|---|---|---|
| 1 | 57 | 11 | 2.4 | 0.5 | — | — | — | — | — | — | — | — | — | — | — | — | — | — |
| 2 | — | 40 | 7.3 | 1.9 | 0.5 | — | — | — | — | — | — | — | — | — | — | — | — | — |
| 3 | — | 40 | 7.3 | 1.9 | 0.5 | — | — | — | — | — | — | — | — | — | — | — | — | — |
| 4 | — | 55 | 12 | 2.7 | 0.7 | — | — | — | — | — | — | — | — | — | — | — | — | — |
| 5 | — | — | 18 | 4.2 | 1.2 | — | — | — | — | — | — | — | — | — | — | — | — | — |
| 6 | — | — | 19 | 4.7 | 1.4 | — | — | — | — | — | — | — | — | — | — | — | — | — |
| 7 | — | — | 28 | 6.5 | 1.8 | 0.5 | — | — | — | — | — | — | — | — | — | — | — | — |
| 8 | — | — | — | 16 | 4.0 | 1.1 | — | — | — | — | — | — | — | — | — | — | — | — |
| 9 | — | — | — | 17 | 4.5 | 1.2 | — | — | — | — | — | — | — | — | — | — | — | — |
| 10 | — | — | — | 21 | 5.7 | 1.5 | 0.5 | — | — | — | — | — | — | — | — | — | — | — |
| 11 | — | — | — | 31 | 8.8 | 2.3 | 0.8 | — | — | — | — | — | — | — | — | — | — | — |
| 12 | — | — | — | 42 | 12 | 3.2 | 1.0 | — | — | — | — | — | — | — | — | — | — | — |
| 13 | — | — | — | 42 | 12 | 3.2 | 1.0 | — | — | — | — | — | — | — | — | — | — | — |
| 14 | — | — | — | 42 | 12 | 3.5 | 1.1 | — | — | — | — | — | — | — | — | — | — | — |
| 15 | — | — | — | 68 | 20 | 6.0 | 2.1 | — | — | — | — | — | — | — | — | — | — | — |
| 16 | — | — | — | — | 37 | 10 | 3.3 | 1.0 | — | — | — | — | — | — | — | — | — | — |
| 17 | — | — | — | — | 48 | 13 | 3.8 | 1.2 | — | — | — | — | — | — | — | — | — | — |
| 18 | — | — | — | — | — | 13 | 4.0 | 1.3 | — | — | — | — | — | — | — | — | — | — |
| 19 | — | — | — | — | — | 16 | 4.5 | 1.3 | — | — | — | — | — | — | — | — | — | — |
| 20 | — | — | — | — | — | 23 | 6.7 | 1.8 | 0.6 | — | — | — | — | — | — | — | — | — |
| 21 | — | — | — | — | — | — | 13 | 4.2 | 1.6 | 0.6 | — | — | — | — | — | — | — | — |
| 22 | — | — | — | — | — | — | — | 18 | 5.8 | 1.7 | — | — | — | — | — | — | — | — |
| 23 | — | — | — | — | — | — | — | 21 | 6.9 | 2.2 | — | — | — | — | — | — | — | — |
| 24 | — | — | — | — | — | — | — | 23 | 7.3 | 2.3 | 0.7 | — | — | — | — | — | — | — |
| 25 | — | — | — | — | — | — | — | 33 | 10 | 2.8 | 0.8 | — | — | — | — | — | — | — |
| 26 | — | — | — | — | — | — | — | — | 10 | 2.5 | 0.7 | — | — | — | — | — | — | — |
| 27 | — | — | — | — | — | — | — | — | 10 | 3.7 | 1.3 | — | — | — | — | — | — | — |
| 28 | — | — | — | — | — | — | — | — | 13 | 3.7 | 1.1 | — | — | — | — | — | — | — |
| 29 | — | — | — | — | — | — | — | — | 15 | 3.9 | 1.3 | — | — | — | — | — | — | — |
| 30 | — | — | — | — | — | — | — | — | 18 | 5.3 | 1.6 | 0.5 | — | — | — | — | — | — |
| 31 | — | — | — | — | — | — | — | — | 18 | 5.4 | 1.5 | 0.5 | — | — | — | — | — | — |
| 32 | — | — | — | — | — | — | — | — | 30 | 10 | 3 | 1.1 | — | — | — | — | — | — |
| 33 | — | — | — | — | — | — | — | — | — | 19 | 5.6 | 2.2 | 0.7 | — | — | — | — | — |
| 34 | — | — | — | — | — | — | — | — | — | 21 | 5.7 | 1.8 | 0.6 | — | — | — | — | — |
| 35 | — | — | — | — | — | — | — | — | — | 25 | 7.6 | 2.3 | 0.8 | — | — | — | — | — |
| 36 | — | — | — | — | — | — | — | — | — | 28 | 7.9 | 3.4 | 1.3 | — | — | — | — | — |
| 37 | — | — | — | — | — | — | — | — | — | 32 | 10 | 3.3 | 1.2 | — | — | — | — | — |
| 38 | — | — | — | — | — | — | — | — | — | 32 | 10 | 3.3 | 1.2 | — | — | — | — | — |
| 39 | — | — | — | — | — | — | — | — | — | — | 18 | 6.3 | 2.1 | 0.7 | — | — | — | — |
| 40 | — | — | — | — | — | — | — | — | — | — | 24 | 8.2 | 2.8 | 0.9 | — | — | — | — |
| 41 | — | — | — | — | — | — | — | — | — | — | — | 18 | 6.0 | 2.3 | 0.9 | — | — | — |
| 42 | — | — | — | — | — | — | — | — | — | — | — | — | — | — | 30 | 13 | 5.3 | — |
| 43 | — | — | — | — | — | — | — | — | — | — | — | — | — | — | — | 33 | 13 | 5.3 |
| 44 | — | — | — | — | — | — | — | — | — | — | — | — | — | — | — | — | — | 75 |

*)EHPC Di(2-ethylhexyl) peroxydicarbonate
CEPC Dicetyl peroxydicarbonate
MYPC Dimyristyl peroxydicarbonate
CHPC Dicyclohexyl peroxydicarbonate
BCHPC Di(4-tert-butylcyclohexyl) peroxydicarbonate
[1])0.1 molar in toluene
[2])0.1 molar in isododecane
[3])0.1 molar in mineral oil
[4])0.1 molar in styrene
[5])extrapolated recommended values

TABLE 2

| No. | INTEROX Code | Chemical name |
|---|---|---|
| 1 | ASCP | ACETYL CYCLOHEXANE SULFONYL PEROXIDE |
| 2 | DIPND | 1,4-DI(2-NEODECANOYLPEROXYISOPROPYL)BENZENE |
| 3 | CUPND | CUMYLPEROXY NEODECANOATE |
| 4 | | PEROXYDICARBONATE |
| 5 | IPPC | DIISOPROPYLPEROXY DICARBONATE |
| 6 | TAPND | Tert-AMYLPEROXY NEODECANOATE |
| 7 | TBPND | Tert-BUTYLPEROXY NEODECANOATE |
| 8 | TAPPI | Tert-AMYLPEROXY PIVALATE |
| 9 | DCLBP | DI(2,4-DICHLOROBENZOYL) PEROXIDE |
| 10 | TBPPI | Tert-BUTYLPEROXY PIVALATE |
| 11 | INP | DI(3,5,5-TRIMETHYLHEXANOYL) PEROXIDE |
| 12 | DP | DIDECANOYL PEROXIDE |
| 13 | LP | DILAUROYL PEROXIDE |
| 14 | | DI(2-METHYLBENZOYL) PEROXIDE |
| 15 | DHPEH | 2,5-DIMETHYL-2,5-DI(2-ETHYLHEXANOYLPEROXY)HEXANE |
| 16 | PMBP | DI(4-METHYLBENZOYL) PEROXIDE |
| 17 | BP | DIBENZOYL PEROXIDE |
| 18 | TAPEH | Tert-AMYLPEROXY 2-ETHYLHEXANOATE |
| 19 | TBPEH | Tert-BUTYLPEROXY 2-ETHYLHEXANOATE |
| 20 | | Tert-BUTYLPEROXY ISOBUTYRATE |
| 21 | TBPM | Tert-BUTYLMONOPEROXY MALEATE |
| 22 | TMCH | 1,1-DI(tert-BUTYLPEROXY)-3,3,5-TRIMETHYLCYCLOHEXANE |
| 23 | CH | 1,1-DI(tert-BUTYLPEROXY)CYCLOHEXANE |
| 24 | | Tert-BUTYLPEROXY ISOPROPYLCARBONATE |
| 25 | TBPIN | Tert-BUTYLPEROXY 3,5,5-TRIMETHYLHEXANOATE |
| 26 | DHPBZ | 2,5-DIMETHYL-2,5-DI(BENZOYLPEROXY)HEXANE |
| 27 | TBP-EHC | Tert-BUTYLPEROXY (2-ETHYLHEXYL)CARBONATE |
| 28 | | Tert-BUTYLPEROXY ACETATE |
| 29 | TABP | Tert-AMYLPEROXY BENZOATE |
| 30 | TBPB | Tert-BUTYLPEROXY BENZOATE |
| 31 | BU | 2,2-DI(tert-BUTYLPEROXY)BUTANE |
| 32 | NBV | n-BUTYL-4,4-DI(tert-BUTYLPEROXY) VALERATE |
| 33 | EBU | ETHYL-3,3-DI(tert-BUTYLPEROXY) BUTYRATE |
| 34 | DCUP | DICUMYL PEROXIDE |
| 35 | BCUP | Tert-BUTYLCUMYL PEROXIDE |
| 36 | DTAP | DI(tert-AMYL) PEROXIDE |
| 37 | DIPP | DI(tert-BUTYLPEROXYISOPROPYL)BENZENE |
| 38 | DHBP | 2,5-DIMETHYL-2,5-DI(tert-BUTYLPEROXY)HEXANE |
| 39 | DTBP | DI(tert-BUTYL) PEROXIDE |
| 40 | DYBP | 2,5-DIMETHYL-2,5-DI(tert-BUTYLPEROXY)HEX-3-YNE |
| 41 | HMCN | 3,3,6,6,9,9-HEXAMETHYL-1,2,4,5-TETRAOXACYCLONONANE |
| 42 | TBHP | Tert-BUTYL HYDROPEROXIDE |
| 43 | CC DFH | 3,4-DIMETHYL-3,4-DIPHENYLHEXANE |
| 44 | CC DFB | 2,3-DIMETHYL-2,3-DIPHENYLBUTANE |

TABLE 3

| | Chemical Name | Structural Formula | |
|---|---|---|---|
| V-70 | 2,2'-Azobis(4-methoxy-2,4-dimethylvaleronitrile) | $CH_3-\underset{\underset{CH_3}{\mid}}{\overset{\overset{OCH_3}{\mid}}{C}}-CH_2-\underset{\underset{CN}{\mid}}{\overset{\overset{CH_3}{\mid}}{C}}-N=N-\underset{\underset{CN}{\mid}}{\overset{\overset{CH_3}{\mid}}{C}}-CH_2-\underset{\underset{CH_3}{\mid}}{\overset{\overset{OCH_3}{\mid}}{C}}-CH_3$ | M.W. 308.42 |
| V-65 | 2,2'-Azobis(2,4-dimethyl-valeronitrile) | $CH_3-CH-CH_2-\underset{\underset{CN}{\mid}}{\overset{\overset{CH_3}{\mid}}{C}}-N=N-\underset{\underset{CN}{\mid}}{\overset{\overset{CH_3}{\mid}}{C}}-CH_2-CH-CH_3$ (with $CH_3$ on CH groups) | M.W. 248.37 |
| V-60 | 2,2'-Azobisisobutyronitrile | $CH_3-\underset{\underset{CN}{\mid}}{\overset{\overset{CH_3}{\mid}}{C}}-N=N-\underset{\underset{CN}{\mid}}{\overset{\overset{CH_3}{\mid}}{C}}-CH_3$ | M.W. 164.21 |
| V-601 | Dimethyl 2,2'-azobisisobutyrate | $CH_3-\underset{\underset{COOCH_3}{\mid}}{\overset{\overset{CH_3}{\mid}}{C}}-N=N-\underset{\underset{COOCH_3}{\mid}}{\overset{\overset{CH_3}{\mid}}{C}}-CH_3$ | M.W. 230.26 |

TABLE 3-continued

| ID | Name | Structure | M.W. |
|---|---|---|---|
| V-59 | 2,2'-Azobis(2-methyl-butyronitrile) | $CH_3-CH_2-\underset{\underset{CN}{|}}{\overset{\overset{CH_3}{|}}{C}}-N=N-\underset{\underset{CN}{|}}{\overset{\overset{CH_3}{|}}{C}}-CH_2-CH_3$ | M.W. 192.26 |
| V-40 | 1,1'-Azobis(1-cyclo-hexanecarbonitrile) | (cyclohexyl-CN)—N=N—(cyclohexyl-CN) | M.W. 244.34 |
| V-30 | 2-(Carbamoylazo)-isobutyronitrile | $CH_3-\underset{\underset{CN}{|}}{\overset{\overset{CH_3}{|}}{C}}-N=N-CONH_2$ | M.W. 140.14 |
| VR-110 | 2,2'-Azobis(2,4,4-trimethyl-pentane) | $CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-N=N-\underset{\underset{CH_3}{|}}{\overset{\overset{CH_3}{|}}{C}}-CH_2-\underset{\underset{CH_3}{|}}{\overset{\overset{CH_3}{|}}{C}}-CH_3$ | M.W. 254.46 |
| V-19 | 2-Phenylazo-2,4-dimethyl-4-methoxyvaleronitrile | $Ph-N=N-\underset{\underset{CN}{|}}{\overset{\overset{CH_3}{|}}{C}}-CH_2-\underset{\underset{OCH_3}{|}}{\overset{\overset{CH_3}{|}}{C}}-CH_3$ | M.W. 245.32 |
| VR-160 | 2,2'-Azobis(2-methylpropane) | $CH_3-\underset{\underset{CH_3}{|}}{\overset{\overset{CH_3}{|}}{C}}-N=N-\underset{\underset{CH_3}{|}}{\overset{\overset{CH_3}{|}}{C}}-CH_3$ | M.W. 142.24 |
| VA-044 | 2,2'-Azobis (N,N'-dimethyleneisobutyramidine) dihydrochloride | (imidazoline)-$\underset{\underset{CH_3}{|}}{\overset{\overset{CH_3}{|}}{C}}-N=N-\underset{\underset{CH_3}{|}}{\overset{\overset{CH_3}{|}}{C}}$-(imidazoline) ·2HCl | M.W. 323.27 |
| V-50 | 2,2'-Azobis (2-amidinopropane) dihydrochloride | $H_2N(HN=)C-\underset{\underset{CH_3}{|}}{\overset{\overset{CH_3}{|}}{C}}-N=N-\underset{\underset{CH_3}{|}}{\overset{\overset{CH_3}{|}}{C}}-C(=NH)NH_2$ ·2HCl | M.W. 271.19 |
| VA-061 | 2,2'-Azobis (N,N'-dimethyleneisobutyramidine) | (imidazoline)-$\underset{\underset{CH_3}{|}}{\overset{\overset{CH_3}{|}}{C}}-N=N-\underset{\underset{CH_3}{|}}{\overset{\overset{CH_3}{|}}{C}}$-(imidazoline) | M.W. 250.35 |
| V-501 | 4,4'-Azobis (4-cyanopentanoic acid) | $HOOC-CH_2-CH_2-\underset{\underset{CN}{|}}{\overset{\overset{CH_3}{|}}{C}}-N=N-\underset{\underset{CN}{|}}{\overset{\overset{CH_3}{|}}{C}}-CH_2-CH_2-COOH$ | M.W. 280.28 |
| VA-080 | 2,2'-Azobis{2-methyl-N-[1,1-bis(hydroxymethyl)-2-hydroxyethyl]propionamide} | $(HOCH_2)_3C-NH-CO-\underset{\underset{CH_3}{|}}{\overset{\overset{CH_3}{|}}{C}}-N=N-\underset{\underset{CH_3}{|}}{\overset{\overset{CH_3}{|}}{C}}-CO-NH-C(CH_2OH)_3$ | M.W. 408.45 |
| VA-082 | 2,2'-Azobis{2-methyl-N-[1,1-bis(hydroxymethyl)ethyl] propionamide} | $CH_3(HOCH_2)_2C-NH-CO-\underset{\underset{CH_3}{|}}{\overset{\overset{CH_3}{|}}{C}}-N=N-\underset{\underset{CH_3}{|}}{\overset{\overset{CH_3}{|}}{C}}-CO-NH-C(CH_3)(CH_2OH)_2$ | M.W. 376.45 |

TABLE 3-continued

| VA-086 | 2,2'-Azobis [2-methyl-N-(2-hydroxyethyl) propionamide] | 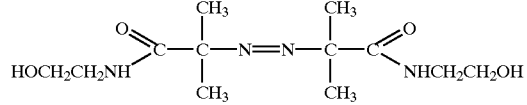 | M.W. 288.35 |
|---|---|---|---|
| VA-088 | 2,2'-Azobis(isobutyramide) dihydrate | 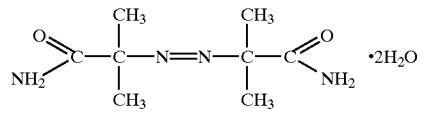 | M.W. 236.27 |

Wako Pure Chemical Industries, Ltd.

| | Appearance | Melting Range | 10 hour half-life decomposition temperature | Solubility at 20° C. (g/100 g solvent) | | | | |
|---|---|---|---|---|---|---|---|---|
| | | | | Toluene | n-Hexane | Ethanol | Methanol | Water |
| V-70 | White crystalline powder | 50–96° C. (Decomposition) | 30° C. in toluene | 3.3 (Benzene) | 1 at 25° C. | — | 2.1 at 25° C. | ● |
| V-65 | White crystals | 45–70° C. | 51° C. in toluene | 72 | 4 | 20.5 at 25° C. | 22 | ● |
| V-60 | White crystalline powder | 100–103° C. | 65° C. in toluene | 7 at 25° C. | — | 3 at 25° C. | 7.5 at 25° C. | ● |
| V-601 | Pale yellow wax | 22–28° C. (Decomposition point 85–87° C.) | 66° C. in toluene | ○ | ○ | ○ | ○ | ● |
| V-59 | White crystalline powder | 55–57° C. (Decomposition point 84–87° C.) | 67° C. in toluene | ○ | — | ○ | ○ | ● |
| V-40 | White crystals | 113–115° C. | 88° C. in toluene | 33 (Benzene) | 0.9 | — | 3.2 | ● |
| V-30 | Pale yellow crystals | 76–78° C. | 104° C. in toluene | — | — | ○ | ○ | ○ |
| VR-110 | Pale yellow crystals or pale yellow liquid | 23–24° C. | 110° C. in diphenylether | ○ | ○ | ○ | — | ● |
| V-19 | Transparent yellow liquid | (Boiling point 149–150° C./1 mmHg) | 122° C. in xylene | ○ | — | ○ | ○ | ● |
| VR-160 | Pale yellow liquid | (Boiling point 109–110° C.) | 160° C. gas phase | ○ | ○ | ○ | ○ | ● |
| VA-044 | White to pale yellow crystals or crystalline powder | 188–193° C. (Decomposition) | 44° C. in water | ● | ● | 0.02 | 1.6 | 35.2 |
| V-50 | White or off-white granular | 160–169° C. (Decomposition) | 56° C. in water | ● | ● | — | 2.1 | 23.2 |
| VA-061 | Pale yellow powder | 115–125° C. (Decomposition) | 61° C. in methanol | ● | — | 2.8 | 9.4 | 0.5 |
| V-501 | White crystalline powder | 120–123° C. (Decomposition) | 69° C. in water | ● | — | ○ | — | 1 |
| VA-080 | Pale yellow crystalline powder | 150–155° C. (Decomposition) | 80° C. in water | ● | ● | — | 1.8 | 2.0 |
| VA-082 | Pale yellow crystalline powder | 156–161° C. (Decomposition) | 82° C. in water | ● | ● | — | 5.1 | 0.6 |
| VA-086 | Pale yellow crystalline powder | 140–145° C. (Decomposition) | 86° C. in water | ● | ● | — | 4.5 | 2.4 |
| VA-088 | Pale yellow crystalline powder | 88–92° C. (Decomposition) | 88° C. in water | ● | ● | 3.6 | 9.6 | 0.8 |

○ Readily soluble
● Insoluble

What is claimed is:

1. A method for producing a block-shaped or plate-shaped polymethacrylimide foamed material, comprising:
   copolymerizing a copolymerization mixture comprising methacrylic acid, methacrylonitrile and optionally a copolymerizable monomer in the presence of a radical-forming initiator to obtain a copolymer;
   post-polymerizing and cyclizing said copolymer to polymethacrylimide; and
   foaming said polymethacrylimide to obtain a foamed material;
   wherein said copolymerizing is performed in the presence of a mixture comprising at least four initiators with graduated half lives;
   wherein each of the initiators has a half live of ½ hour at a certain temperature and said temperature differs by at least 10° C. for each of said initiators.

2. The method according to claim 1, wherein a mixture of slow, middle and fast decomposing agents having half lives of one half hour in the ranges of from 40 to 60° C., 60 to 85° C., 85 to 110° C. and 110 to 130° C. is used as initiator mixture.

3. The method according to claim 1, wherein a mixture of slow, middle and fast decomposing agents having half lives of one half hour in the ranges of from 50 to 57° C., 70 to 80° C., 85 to 105° C. and 115 to 125° C. is used as initiator mixture.

4. The method according to claim 1, wherein said copolymerizing is tempered completely or in stages using a water bath, whose temperature is constant throughout an entire polymerization time or for each stage.

5. The method according to claim 1, wherein the copolymerization mixture comprises a filler.

6. The method according to claim 5, wherein the copolymerization mixture comprises an electrically conductive particle.

7. A foamed block or a foamed plate of polymethacrylimide, obtained by the method according to claim 1.

8. The foamed block or foamed plate according to claim 7, having a thickness of from 80 to 300 mm.

9. A method for producing a polymer plate, comprising:
copolymerizing methacrylic acid, methacrylonitrile and optionally a copolymerizable monomer in the presence of radical-forming initiators to obtain a copolymer; and
post-polymerizing said copolymer;
wherein said copolymerizing is performed in the presence of a mixture comprising at least four initiators with graduated half lives;
wherein each of the initiators has a half live of ½ hour at a certain temperature and said temperature differs by at least 10° C. for each of said initiators.

10. A polymer plate obtained by the method according to claim 9.

11. A method, comprising:
constructing an aircraft comprising the foamed block or the foamed plate according to claim 7.

12. A method, comprising:
constructing an aircraft comprising the foamed block or the foamed plate according to claim 8.

13. The method according to claim 6, wherein said electrically conductive particle comprises a carbon fiber.

14. The method according to claim 1, wherein said copolymerizing proceeds under isothermal conditions.

* * * * *